United States Patent
O Tae

(10) Patent No.: US 6,398,168 B1
(45) Date of Patent: Jun. 4, 2002

(54) APPARATUS FOR OPERATING THE FRONT PANEL OF A CAR AUDIO SYSTEM

(75) Inventor: Kwon O Tae, Ichon-shi (KR)

(73) Assignee: Hyundai Autonet Co., Ltd., Ichon-Shi (KR)

( * ) Notice: Subject to any disclaimer, the term of this patent is extended or adjusted under 35 U.S.C. 154(b) by 0 days.

(21) Appl. No.: 09/835,418

(22) Filed: Apr. 17, 2001

(30) Foreign Application Priority Data

Dec. 6, 2000 (KR) ............................................ 00/73614

(51) Int. Cl.⁷ .............................................. G11B 33/02
(52) U.S. Cl. ...................... 248/27.3; 360/137; 369/75.1
(58) Field of Search ........................ 248/27.3; 455/345; 360/137; 369/75.1

(56) References Cited

U.S. PATENT DOCUMENTS

| | | | |
|---|---|---|---|
| 5,010,437 A | * 4/1991 | Utsugi et al. | 360/137 |
| 5,177,730 A | * 1/1993 | Utsugi | 360/137 |
| 5,848,042 A | * 12/1998 | Takahashi et al. | 360/137 |
| 5,852,594 A | * 12/1998 | Kaise et al. | 360/99.02 |
| 5,953,302 A | * 9/1999 | Kobayashi | 361/814 |

FOREIGN PATENT DOCUMENTS

JP 402015450 A1 * 9/1990 ................. 360/137

* cited by examiner

Primary Examiner—Leslie A. Braun
Assistant Examiner—Jon Szumny
(74) Attorney, Agent, or Firm—Armstrong, Westerman & Hattori, LLP.

(57) ABSTRACT

An apparatus for operating the front panel of a car audio system. The apparatus includes a guide rack, a main chassis, a front chassis, a trim plate, a front panel and a linkage. The guide rack is comprised of a rack body and a slide link. The main chassis is provided at its right side with a plurality of rack shafts and a damper gear. The front chassis covers the open front of the main chassis, and is provided with two vertical link guide slots, two link tabs, a link guide recess, a spring holder and auxiliary spring holders. The trim plate covers the front surface of the front chassis, and is provided at its both sides with two vertical link guide slots. The front panel, to which a control panel is attached, is provided with a plurality of link holders and a link guide recess. The linkage connects the front chassis and the front panel, and selectively locks and unlocks the guide rack.

4 Claims, 23 Drawing Sheets

APPARATUS FOR OPERATING THE FRONT PANEL OF A CAR AUDIO SYSTEM

BACKGROUND OF THE INVENTION

1. Field of the Invention

The present invention relates generally to a car audio system, and more particularly to an apparatus for manually operating a front panel mounted on the front of a car audio system to be selectively laid down and erected.

2. Description of the Prior Art

U.S. Pat. No. 5,010,437 discloses "Recording medium player" in which an open/close body consisting of inner and outer cover portions is pivotably supported by a support member. When the open/close body is pivoted to its open position, the front portion of a cabinet in which a cassette tape insertion slot is formed is exposed to the outside, while the outer surface of the outer cover portion is laid down. As a result, there occurs a shortcoming that a user cannot manipulate control buttons mounted on the outer surface of the outer cover portion of the open/close body.

In addition, solenoid means is employed in the patent.

SUMMARY OF THE INVENTION

Accordingly, the present invention has been made keeping in mind the above problems occurring in the prior art, and an object of the present invention is to provide an apparatus for operating the front panel of a car audio system, which is capable of operating the front panel (mounted on the front of the car audio system and provided with a control panel) so as to be selectively laid down and erected, thereby allowing the control panel to be manipulated while the front panel is laid down.

In order to accomplish the above object, the present invention provides an apparatus for operating the front panel of a car audio system, comprising: a guide rack comprised of a rack body and a slide link, the rack body being provided with a guide slot horizontally extended, a spring holder for holding one end of a main spring and a guide gear portion formed on its upper surface, the slide link being integrally extended from the front end of the guide rack; a main chassis provided at its right side with a plurality of rack shafts and a damper gear, the rack shafts being situated to be extended through the guide slot of the rack body so as to support the guide rack while the guide rack is slid, the damper gear being engaged with the guide gear portion of the rack body while the guide rack is reciprocated; a front chassis covering the open front of the main chassis, the front chassis being provided on both side ends of its front surface with two vertical link guide slots and two link tabs, on the upper and lower portions of its right end with a link guide recess and a spring holder, and on the interior portions of its both sides with auxiliary spring holders to hold first ends of two auxiliary springs; a trim plate covering the front surface of the front chassis, the trim plate being provided at its both sides with two vertical link guide slots; a front panel to which a control panel is attached, the front panel being provided on its right and left ends with a plurality of link holders and on its right end with a link guide recess, the front panel being connected to the front chassis and the guide rack so as to be laid down by the restoring force of a main spring held by the spring holders of the front chassis and the guide rack when the guide rack is slid; and a linkage for connecting the front chassis and the front panel, and selectively locking and unlocking the guide rack.

The linkage may comprise: a first left link connected at its first end to a link tab formed on the left end of the front chassis, and at its second end to a link holder formed on the left end of the front panel through the vertical link guide slot formed on the left side of the trim plate; a second left link, a first end of the second left link being connected to a link holder formed on the left end of the front panel through a vertical link guide slot formed on the left side of the trim plate, a second end of the second left link being provided with an auxiliary spring holder and inserted into a vertical link guide slot formed on the left side of the front chassis; a first right link connected at its first end to a link tab formed on the left end of the front chassis, and at its second end to a link holder formed on the right end of the front panel through the vertical link guide slot formed on the right side of the trim plate; a second right link, a first end of the second right link being connected to a link holder formed on the right end of the front panel through the vertical link guide slot formed on the right side of the front chassis, a second end of the second right link being provided with an auxiliary spring holder and inserted into the vertical link guide slot formed on the right side of the front chassis; an unlocking link, a front portion of the unlocking link being situated to be extended through the link guide recesses formed on the right end of the front chassis and the right end of the front panel, a rear portion of the unlocking link being provided with an auxiliary spring holder and a link unlocking notch; and a locking link rotatably attached to the inner side of the right side of the main chassis in the vicinity of the guide rack, and provided with a projection for engaging with the link unlocking notch and a locking notch for engaging with the slide hook of the guide rack.

The linkage may be constructed to be operated in such a way that a user pushes the unlocking link extended through the link guide recess formed on the right end of the front panel, the unlocking link is rotated counterclockwise around its shaft, the locking link is rotated clockwise around its shaft by the projection engaged with the link unlocking notch, the slide hook of the guide rack is unlocked, and the elastic restoring force of the main spring allows the guide rack to be advanced through the front chassis, thereby operating the front panel to be laid down.

The linkage may be constructed to be operated in such a way that as the guide rack is moved into the main chassis, the main spring is extended, the locking notch of the locking link is engaged with the slide hook, and the guide rack is locked, thereby keeping the front panel fully erect.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
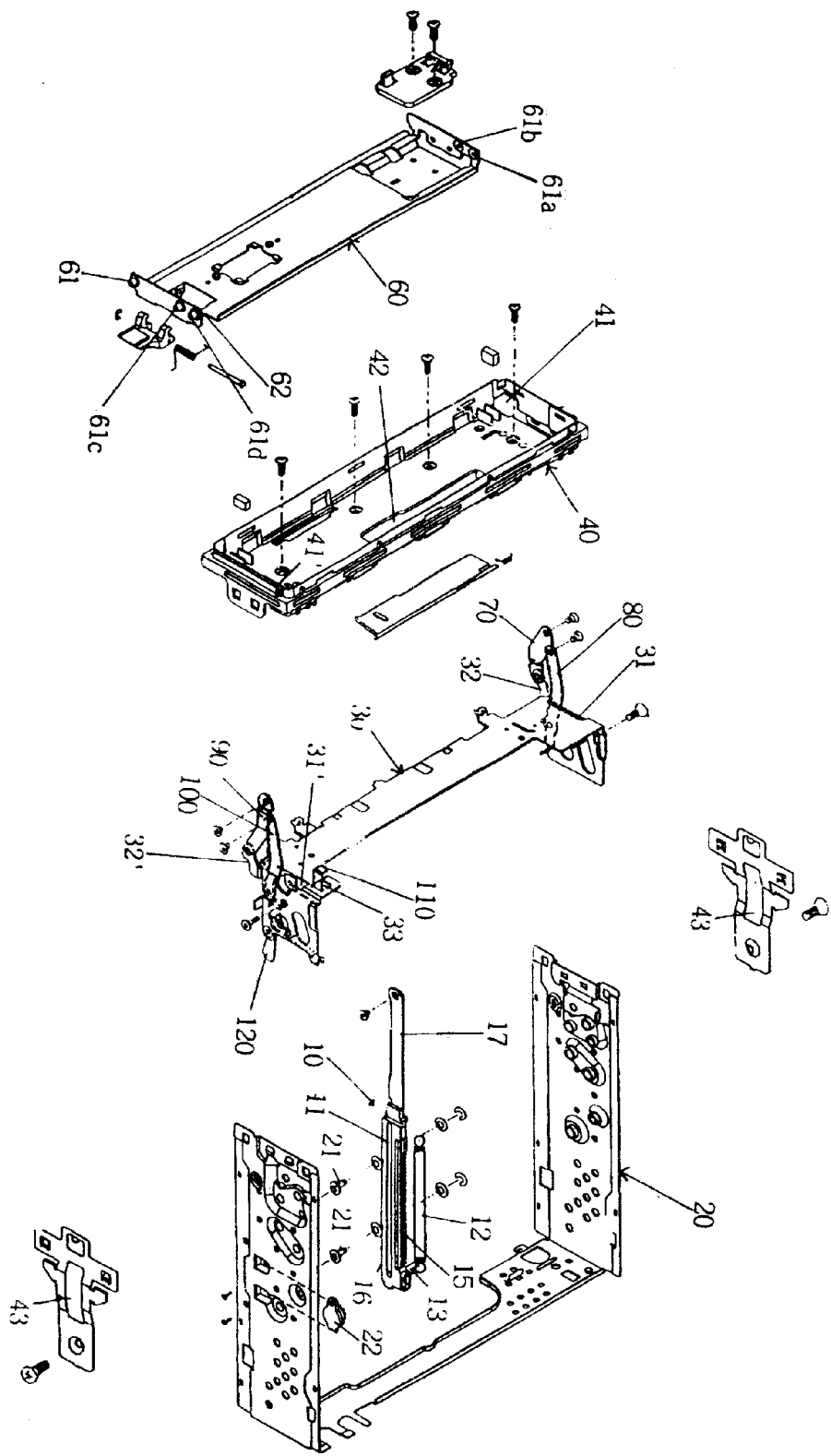
FIG. 1 is an exploded perspective view showing an apparatus for opeating the front panel of a car audio system in accordance with the present invention.

Reference now should be made to the drawings, in which the same reference numerals are used throughout the different drawings to designate the same or similar components.

Figure 4:
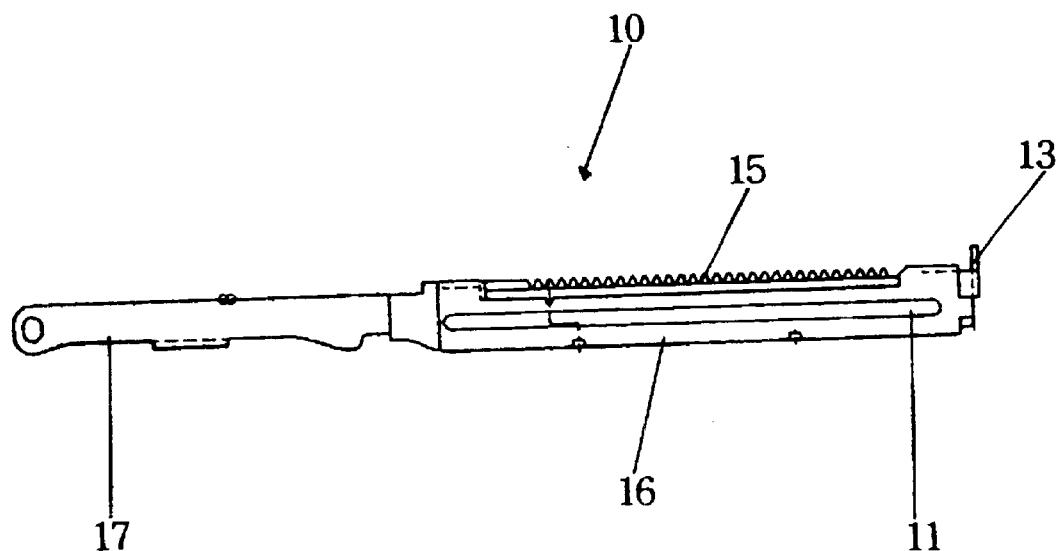
FIG. 4 is a detailed side view showing the guide rack of FIG. 1.
Figure 5:
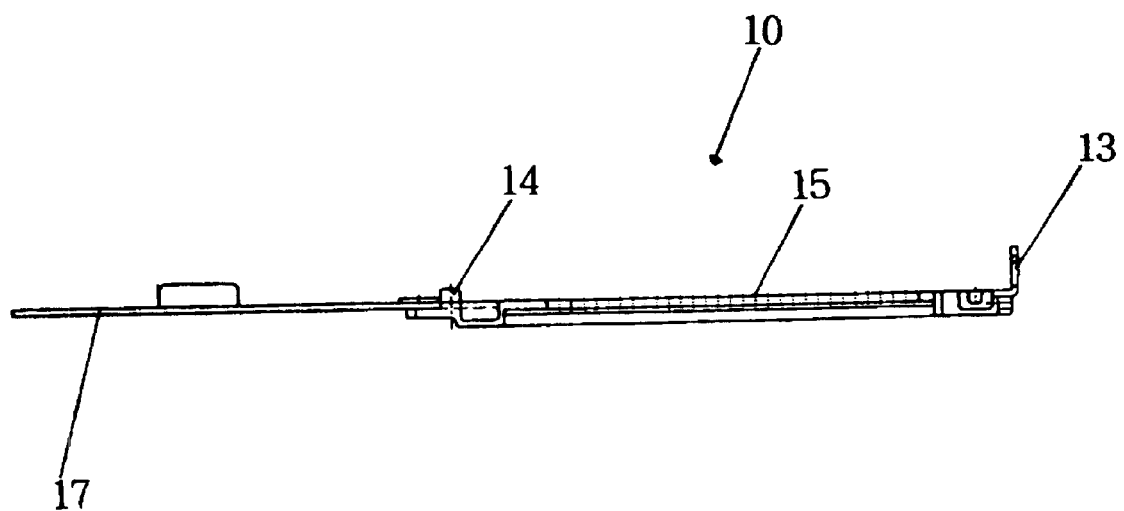
FIG. 5 is a plan view showing the guide rack of FIG. 4.
Figure 6:
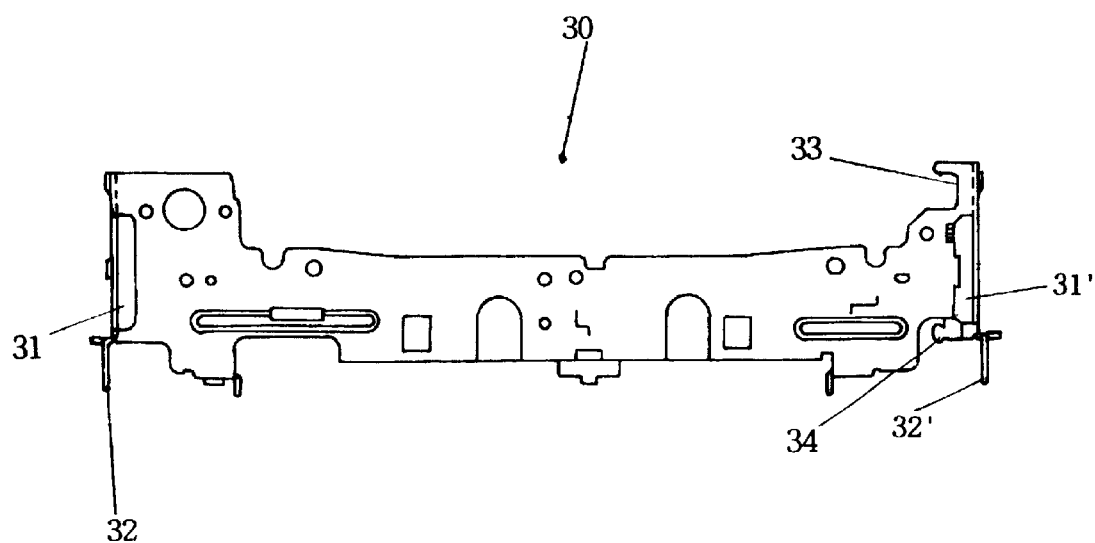
FIG. 6 is a front view showing the front chassis of FIG. 1.
Figure 7A:
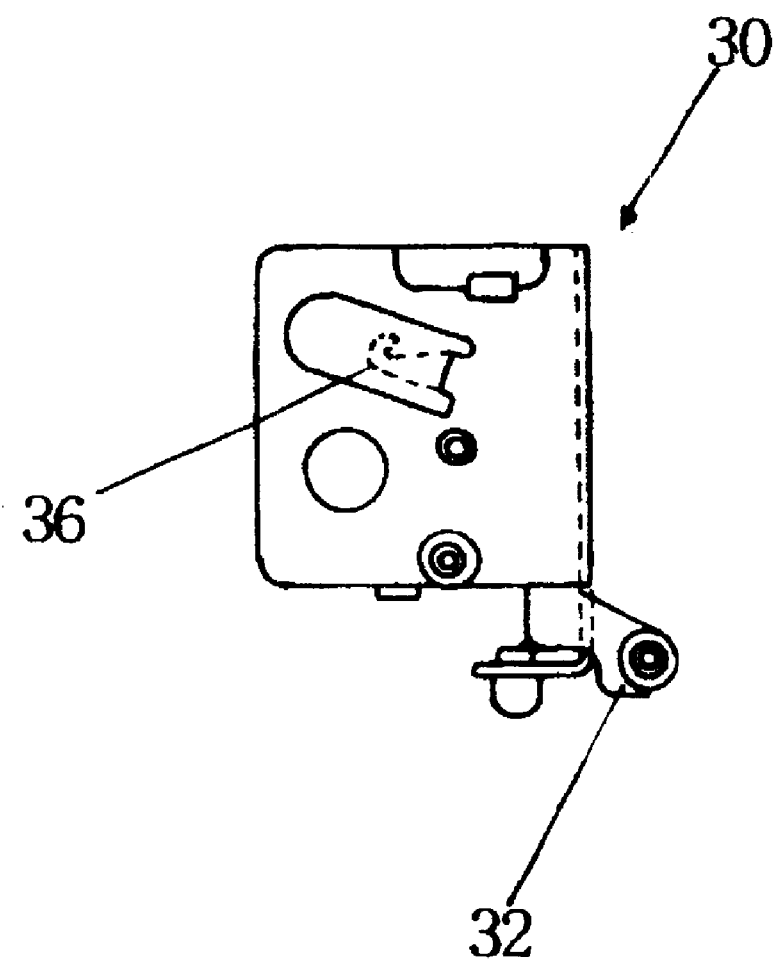
FIGS. 7a and 7b are left and right side views, respectively.
Figure 7B:
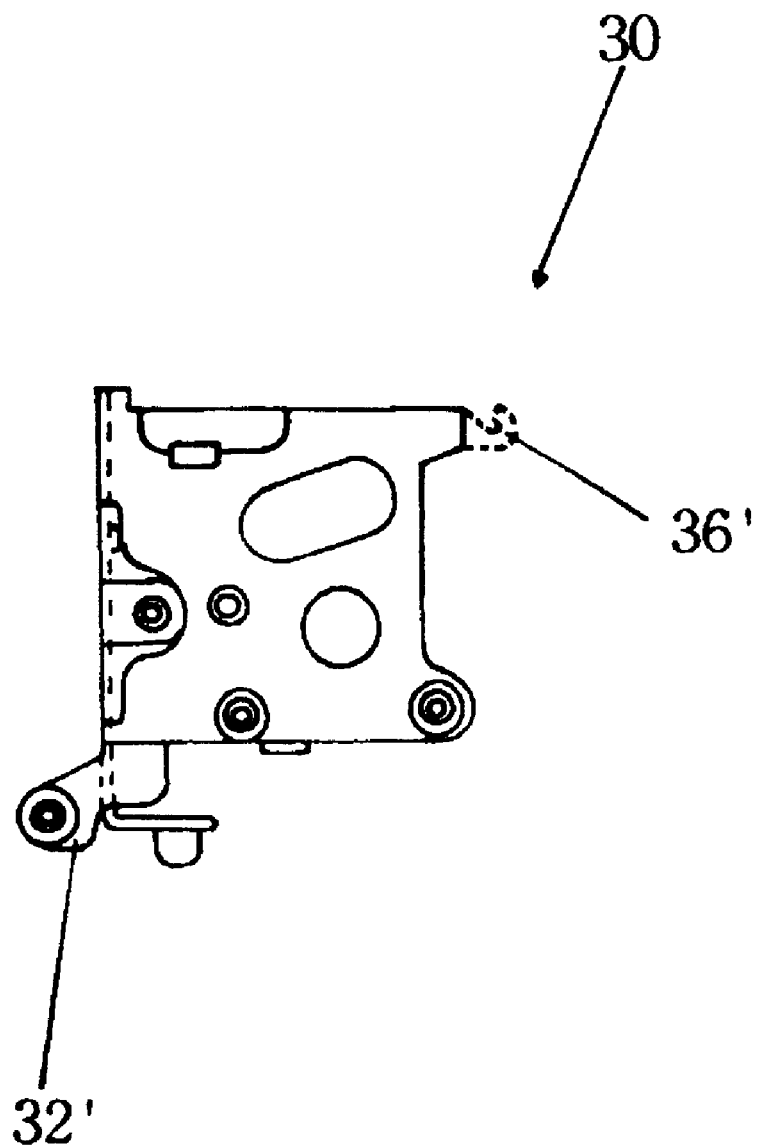
Figure 8:
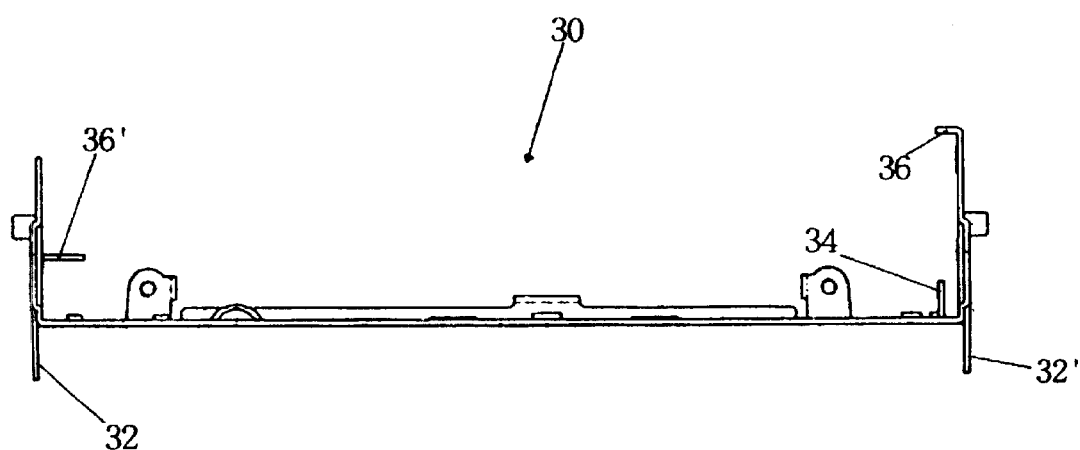
FIG. 8 is plan view showing the front chassis of FIG. 6.
Figure 9A:
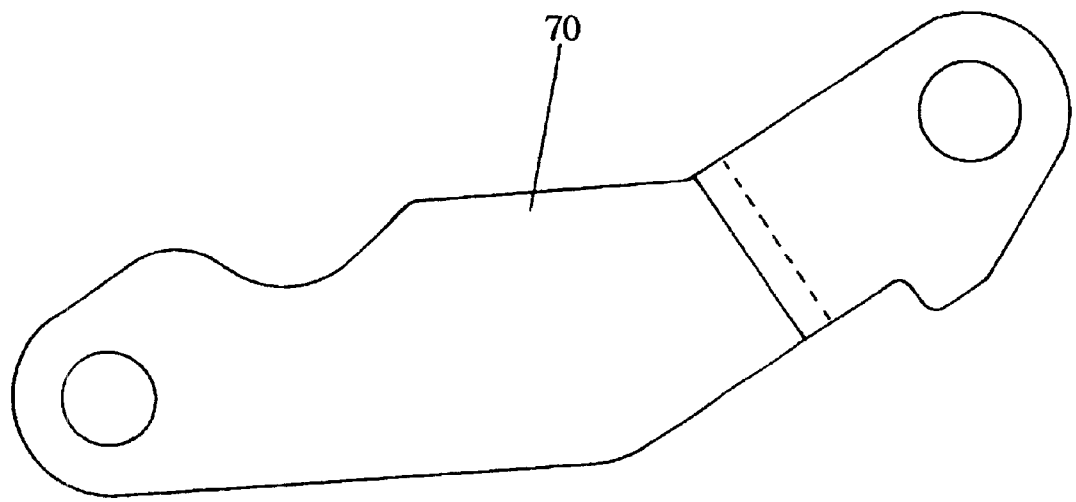
FIGS. 9a and 9b are side and plan views showing the first left link of FIG. 1.
Figure 9B:
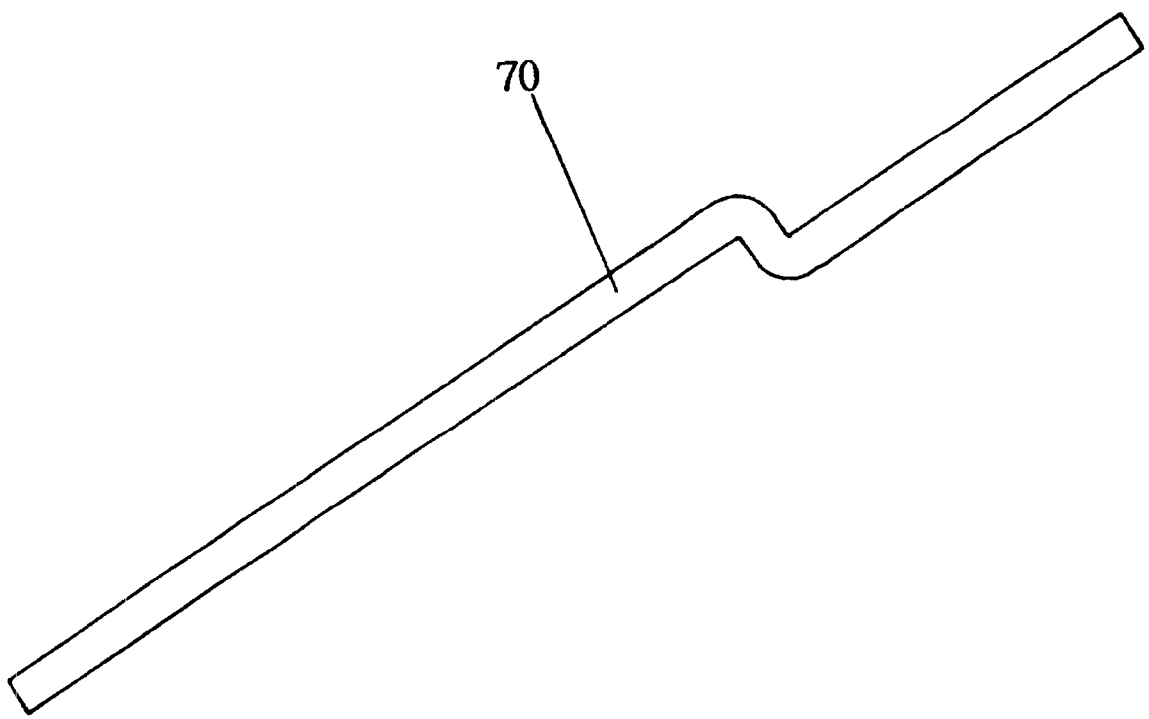
Figure 10A:
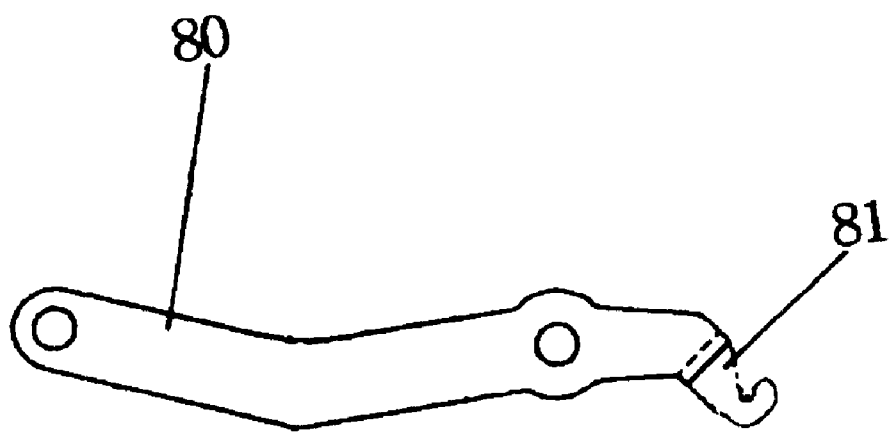
FIGS. 10a and 10b are side and plan views showing the second left link of FIG. 1.
Figure 10B:
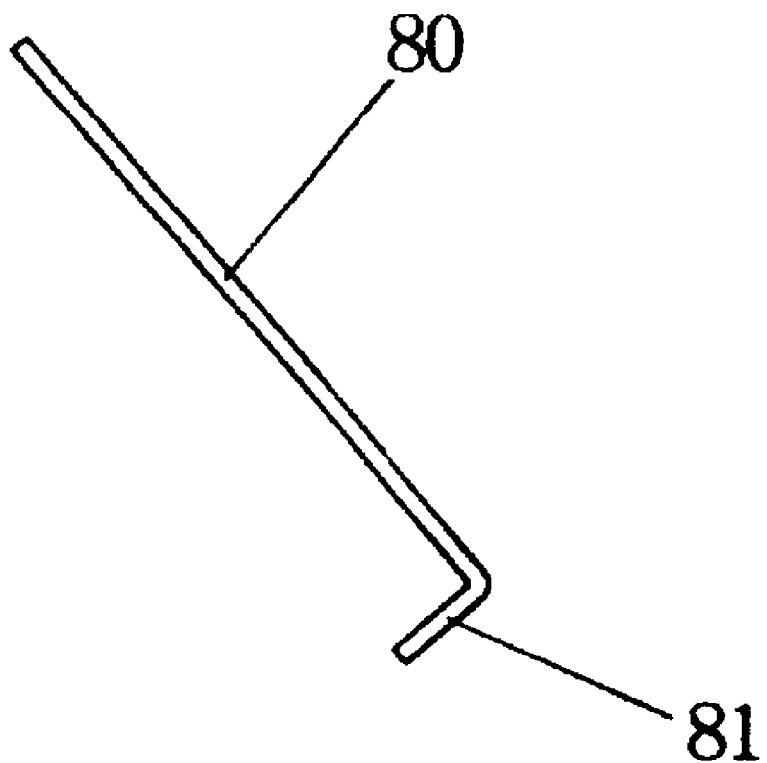
Figure 11A:
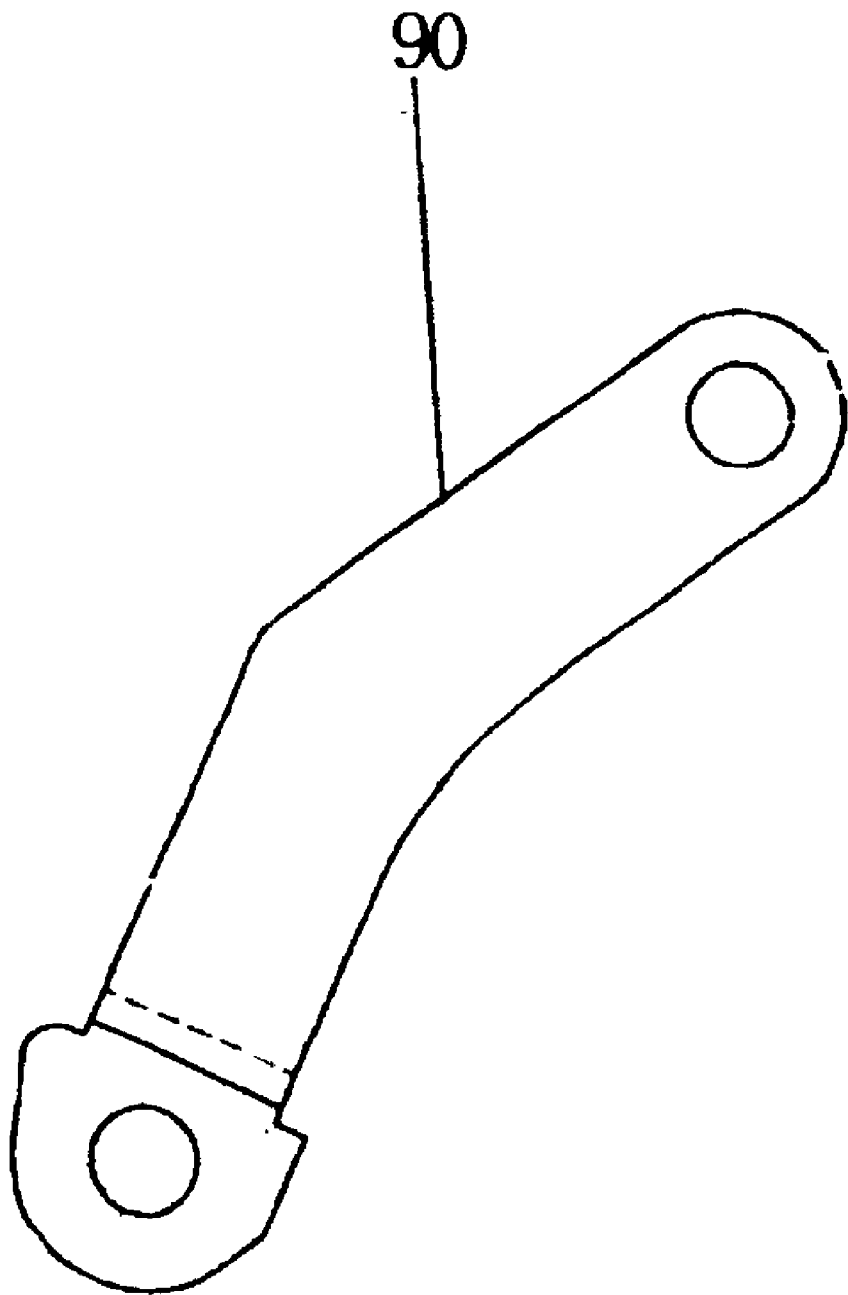
FIGS. 11a and 11b are side and plan views showing the first right link of FIG. 1.
Figure 11B:
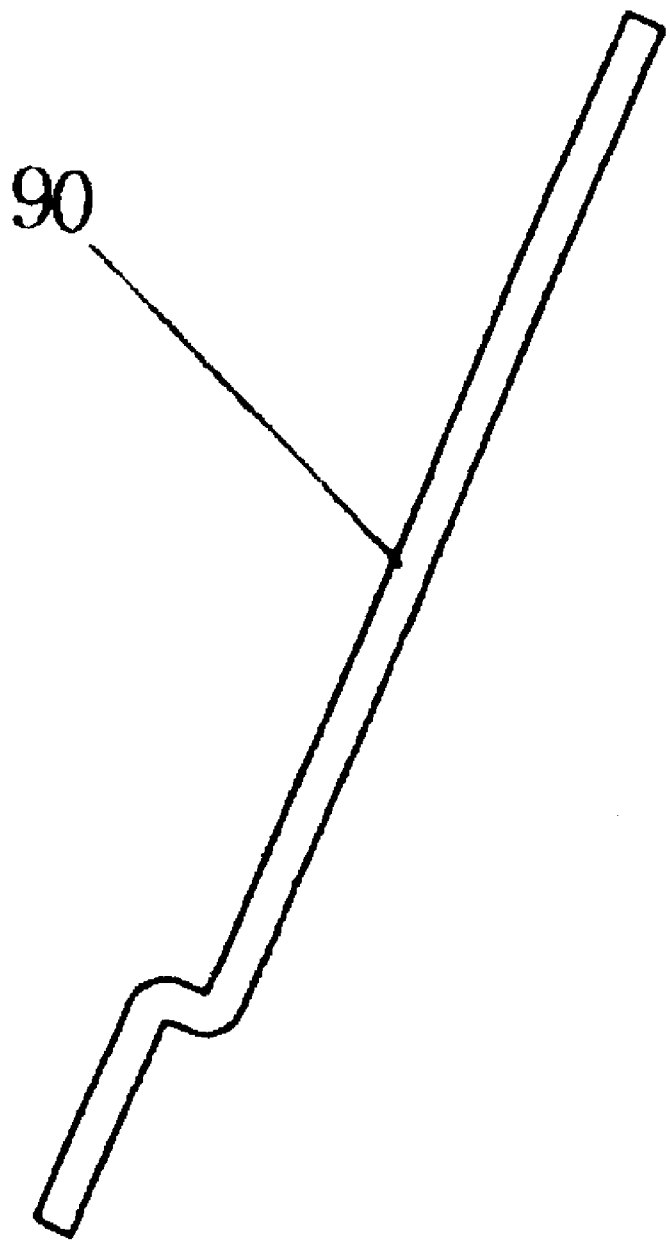
Figure 12:
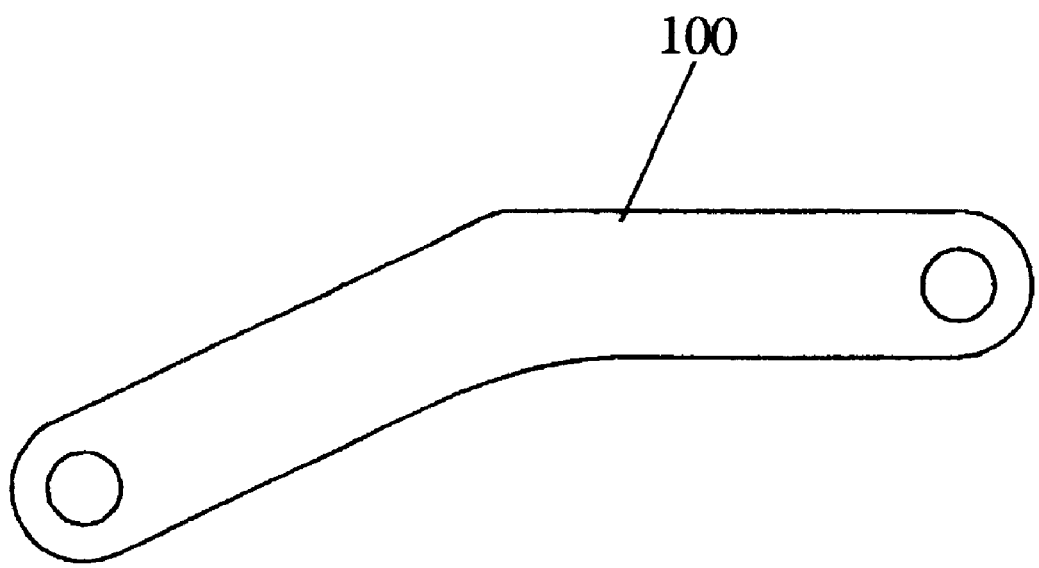
FIG. 12 is a side view showing the second right link of FIG. 1.
Figure 13A:
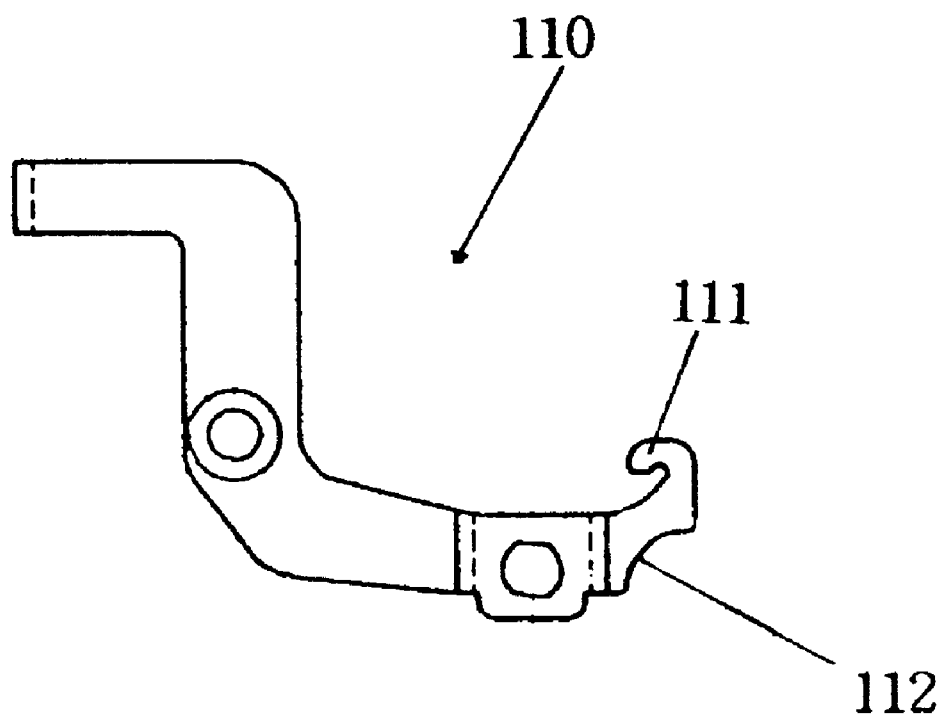
FIGS. 13a and 13b are side and plan views showing the unlocking link FIG. 1.
Figure 13B:
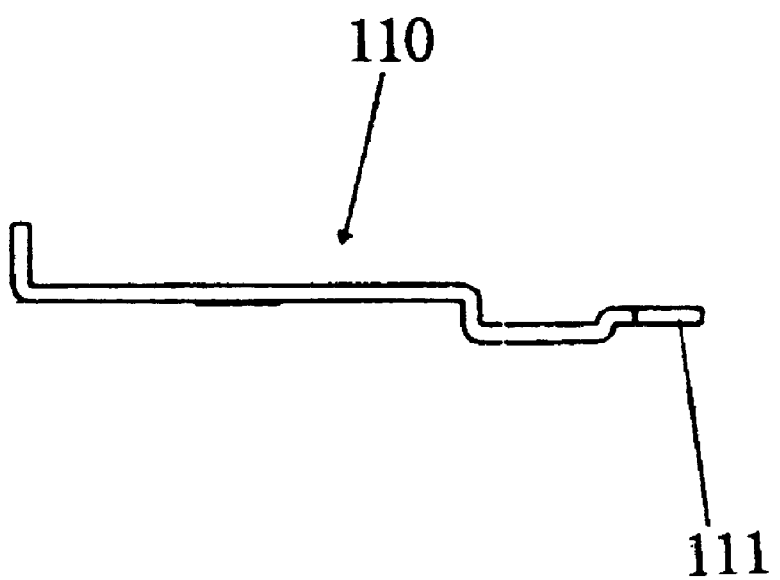
Figure 14A:
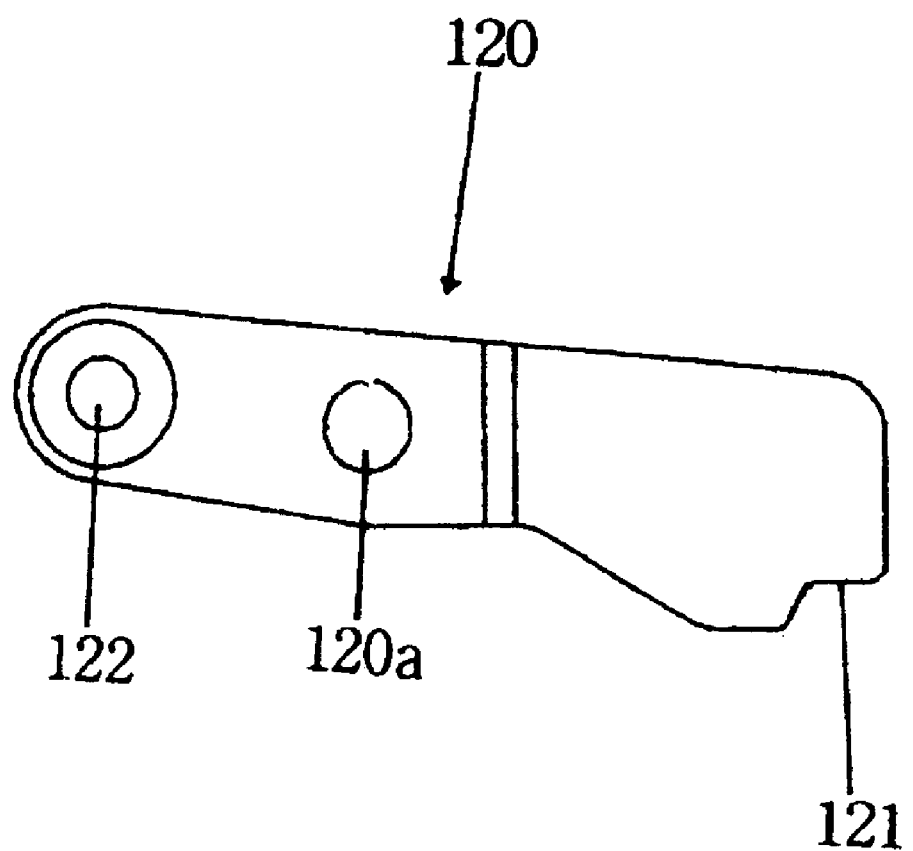
FIGS. 14a and 14b are side and plan views showing the locking link of FIG. 1.
Figure 14B:
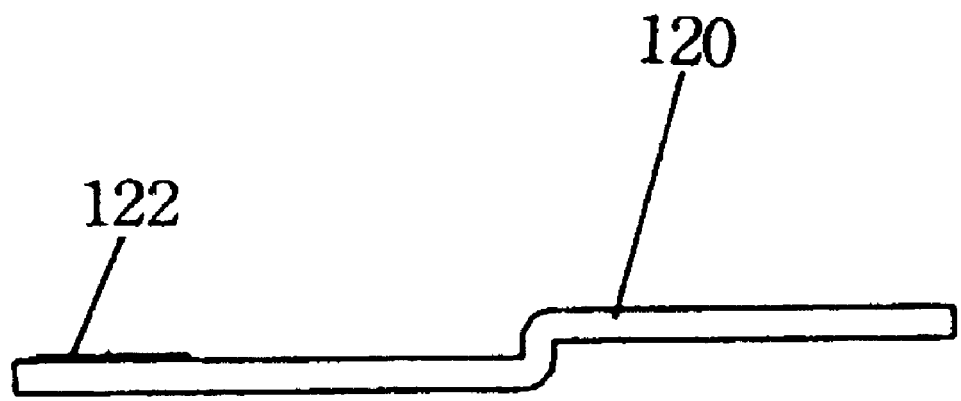

With reference to FIGS. 1, 4 and 5, a guide rack 10 is comprised of a rack body 16 and a slide link 17. A single guide rack 10 suffices to construct the apparatus of the present invention.

The rack body 16 is provided with a guide slot 11 horizontally extended, a spring holder 13 formed on a side of its rear end for holding one end of a main spring 12, a slide hook 14 formed on a side of its front end, and a guide gear portion 15 formed on its upper edge. The other end of the main spring 12 is held by a spring holder (described later) formed on a front chassis (described later). Accordingly, the main spring 12 is extended and compressed by this spring holder.

The slide link 17 is integrally extended from the front end of the rack body 16. The front end of the slide link 17 is connected to a link holder 61 formed on the lower portion of the right side surface of the front panel 60. As the guide rack 10 is reciprocated, the lower portion of the front panel 60 is reciprocated.

Figure 15A:
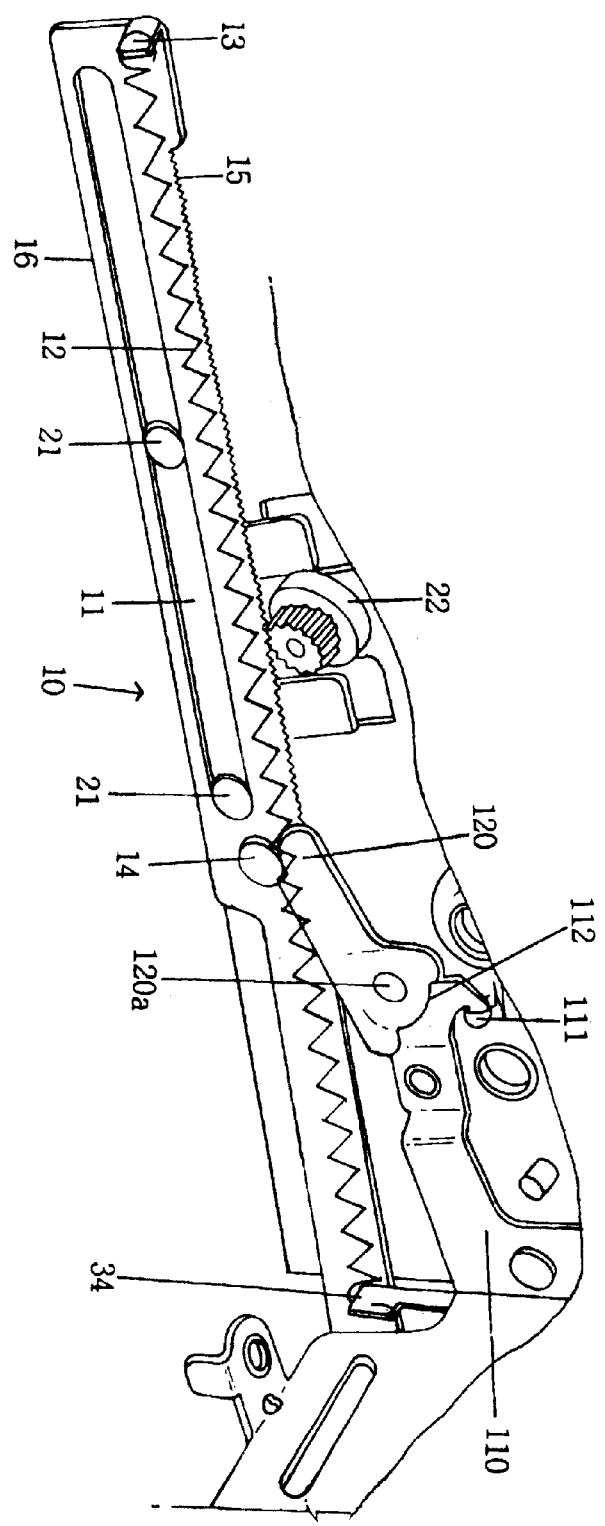
FIGS. 15a and 15b are views showing the states in which while the front panel is operated, the locking link, the unlocking link and the guide rack are operated.
Figure 15B:
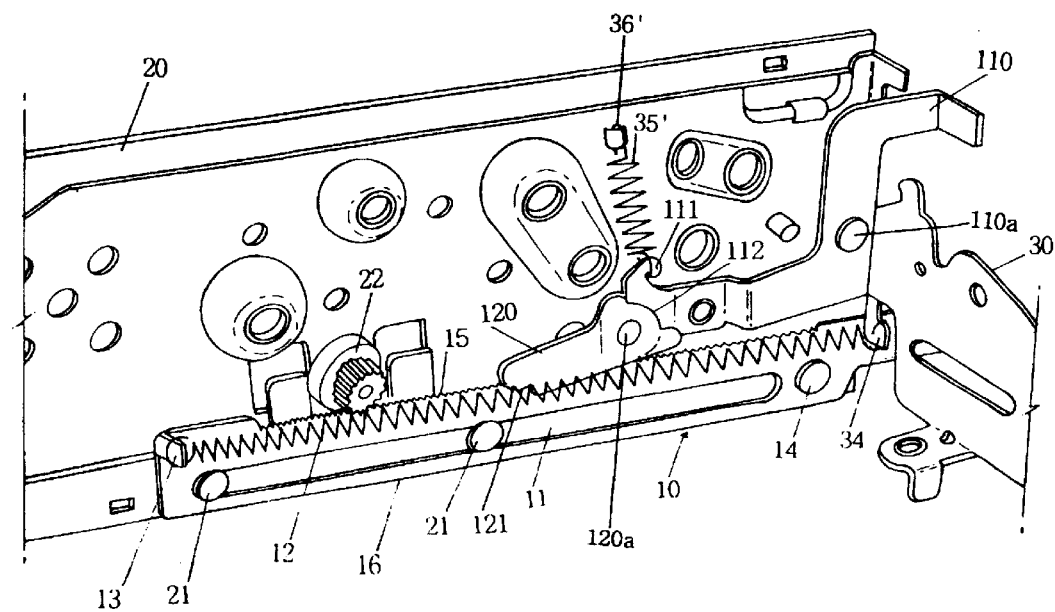

Referring to FIGS. 1, 15a and 15b, a main chassis 20 has a rectangular shape the front portion of which is opened. Two rack shafts 21 are fixed to the inner surface of a side of the main chassis 20 to be inserted into the guide slot 11 and to support and restrict the guide rack 10 so that the guide rack 10 conducts reciprocating movement. A damper gear 22 is fixed to the inner surface of the side of the main chassis 20 to be engaged with the guide gear portion 15 of the guide rack 10.

The damper gear 22 is engaged with the guide gear portion 15, and allows the guide rack 10 to be smoothly slid while the guide rack 10 is horizontally reciprocated.

The front chassis 30 covers the open front of the main chassis 20. As illustrated in FIGS. 6, 7, 8, 15a and 15b, a vertical link guide slot 31 and a link tab 32, and a vertical link guide slot 31' and a link tab 32' are formed on both side ends of the front surface of the front chassis 30, respectively. A link guide recess 33 and a spring holder 34 are formed on the upper and lower portions of the right end of the front chassis 30, respectively. As described above, the spring holder 34 serves to hold one end of the main spring 12 the other end of which is held by the spring holder 13 formed on the guide rack 10. Auxiliary spring holders 36 and 36' are formed on the interior portions of both sides of the front chassis 30 to hold the first ends of two auxiliary springs 35 and 35' the second ends of which are held by two auxiliary spring holders 81 and 81' formed on two second links 80 and 100.

Referring to FIG. 1, a trim plate 40 covers the front surface of the front chassis 30. Two vertical link guide slots 41 and 41' are formed on both sides of the trim plate 40, and a cassette tape insertion slot 42 is formed on the central upper portion of the trim plate 40. The cassette tape insertion slot 42 shown in FIG. 1 can be replaced with a CD insertion slot.

Both sides of the trim plate 40 are secured to both sides of the main chassis 20 by two installation springs 43, so the front of the front chassis 30 is covered by the trim plate 40.

Figure 2:
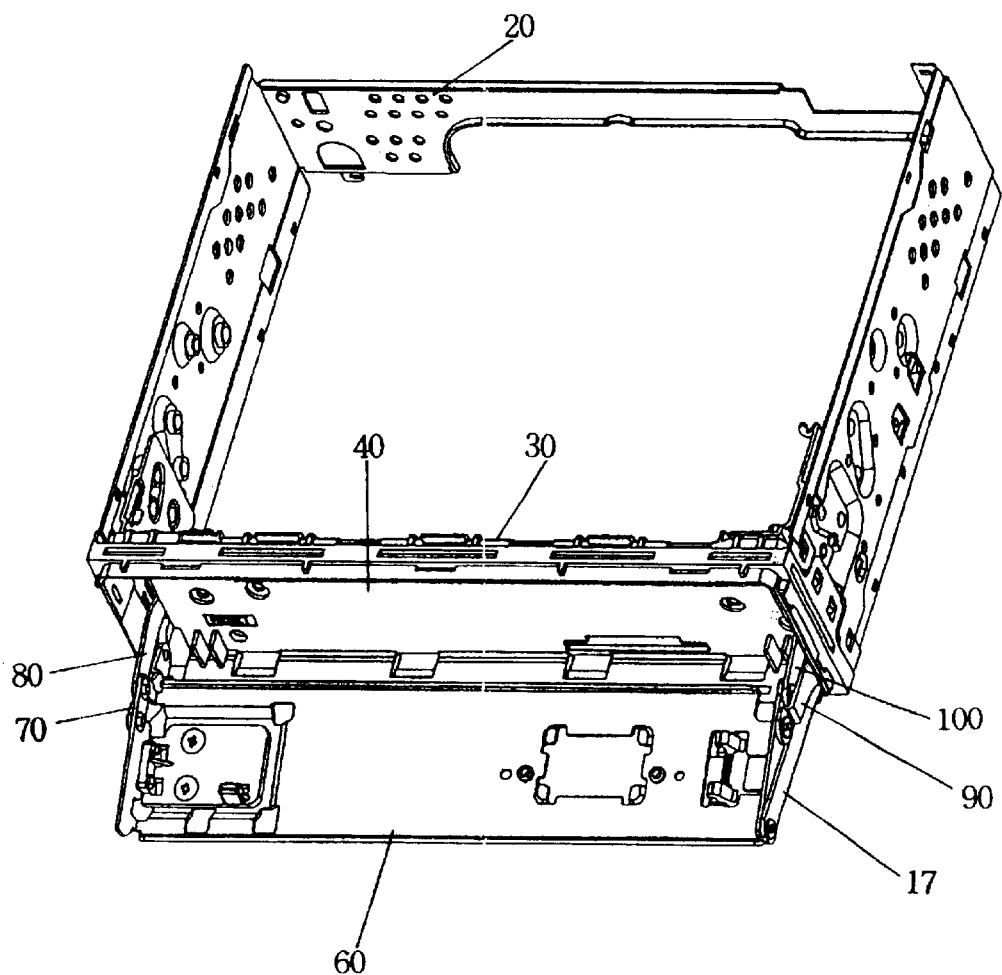
FIG. 2 is a perspective view showing an assembled apparatus for operating the front panel of a car audio system in accordance with the present invention.
Figure 3:
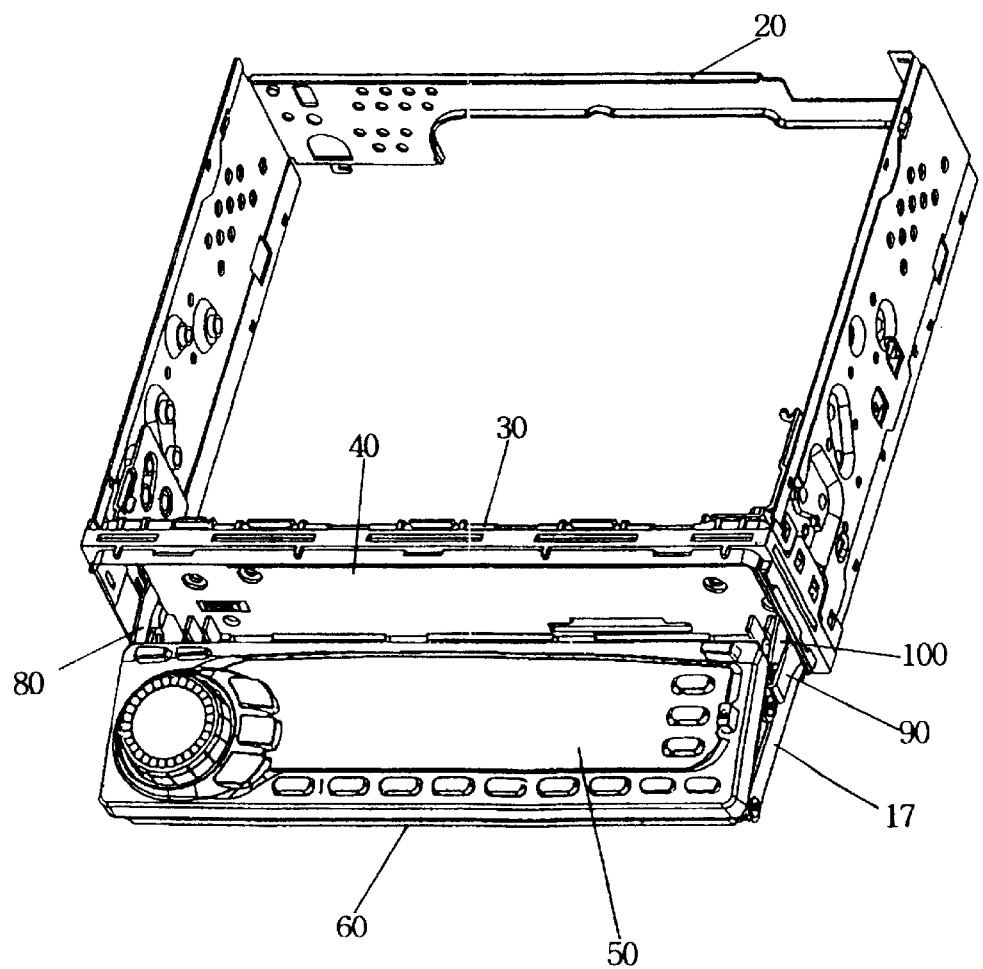
FIG. 3 is a perspective view showing the state in which a control panel is attached to the front panel of the apparatus.

Referring to FIGS. 1 to 3, a car audio control panel 50 is attached to the front surface of the front panel 60, a plurality of link holders 61 are formed on both sides of the front panel 60, and a link guide recess 62 is formed on the right end of the front panel 60.

The front panel 60 is connected to the front chassis 30 and the guide rack 10 by a linkage.

The linkage connects the front chassis 30 and the front panel 60 to each other, and selectively locks and unlocks the guide rack 10. The linkage is comprised of first and second left links 70 and 80 and first and second right links 90 and 100.

The first left link 70, as shown in FIGS. 1 to 3, 9a and 9b, is connected at its one end to the link tab 32 formed on the left end of the front chassis 30, and at its other end to a link holder 61b formed on the left end of the front panel 60 through the vertical link guide slot 41 formed on the left side of the trim plate 40.

Figure 16:
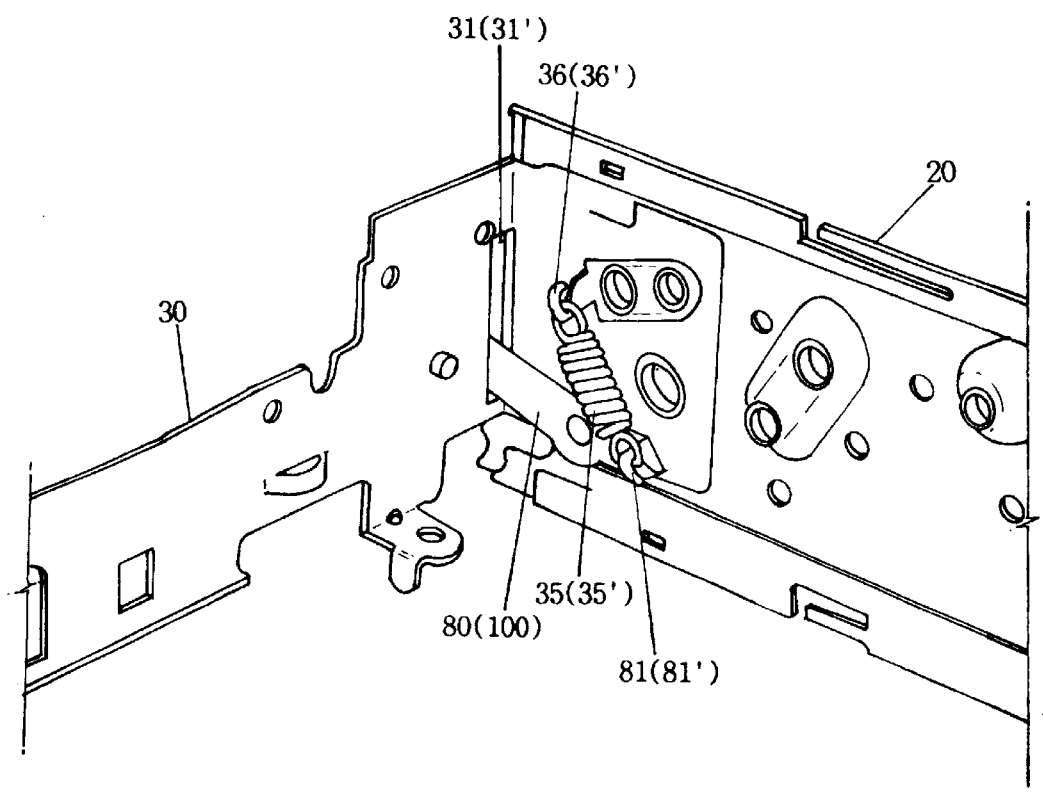
FIG. 16 is a view showing the state in which while the front panel is operated, the second left link is operated.

One end of the second left link 80, as illustrated in FIGS. 1 to 3, 10a and 10b, is connected to the link holder 61a formed on the left end of the front panel 60 through the vertical link guide slot 41 formed on the left side of the trim plate 40, and its other end, as illustrated in FIG. 16, is provided with an auxiliary spring holder 81 and inserted into the vertical link guide slot 31 formed on the left side of the front chassis 30. The auxiliary spring holder 81 holds one end of the auxiliary spring 35, the other end of which is held by the auxiliary spring holder 36 formed on the inner surface of the left side of the front chassis 30.

The first right link 90, as shown in FIGS. 1 to 3, 11a and 11b, is connected at its one end to the link tab 32' formed on the left end of the front chassis 30, and at its other end to a link holder 61c formed on the right end of the front panel 60 through the vertical link guide slot 41' formed on the right side of the trim plate 40.

One end of the second right link 100, as illustrated in FIGS. 1 to 3 and 11, is connected to the link holder 61d formed on the right end of the front panel 60 through the vertical link guide slot 31' formed on the right side of the front chassis 40, and its other end, as illustrated in FIG. 16, is provided with an auxiliary spring holder 81 and inserted into the vertical link guide slot 31' formed on the right side of the front chassis 30. The auxiliary spring holder 81 holds one end of the auxiliary spring 35, the other end of which is held by the auxiliary spring holder 36 formed on the inner surface of the left side of the front chassis 30.

The front portion of an unlocking link 110, as shown in FIGS. 1, 13a, 13b, 15a and 15b, is situated to be extended through the link guide recess 33 formed on the right end of the front chassis 30 and the link guide recess 62 formed on the right end of the front panel 60, and the rear portion of the unlocking link 110 is provided with an auxiliary spring holder 111 and a link unlocking notch 112. One end of an auxiliary spring 35' is held by the auxiliary spring holder 111 and the other end of the auxiliary spring 35' is held by the auxiliary spring holder 36' formed on the inner surface of one side of the main chassis 20.

A locking link 120, as shown in FIGS. 14a, 14b, 15a and 15b, is rotatably attached to the inner surface of the right side of the main chassis 20 in the vicinity of the guide rack 10. The locking link 120 is provided with a projection 122 for engaging with the link unlocking notch 112 and a locking notch 121 for engaging with the slide hook 14 of the guide rack 10.

The operation of an apparatus for operating the front panel of a car audio system is described hereunder.

With reference to FIGS. 15a and 15b, when a user pushes the unlocking link 110 extended through the link guide recess 62 formed on the right end of the front panel 60 so as to operate the front panel 60 to be laid down, the unlocking link 110 is counterclockwise rotated around the shaft 110a so that the locking link 120 is rotated clockwise around the shaft 120a by the projection 122 engaged with the link unlocking notch 112. Accordingly, the slide hook 14 of the guide rack 10 having been held by the locking notch 121 of the locking link 120 is unlocked.

When the slide hook 14 is unlocked, the elastic restoring force of the main spring 12 having been held and extended by the spring holder 13 of the guide rack 10 and the spring rack 34 of the front chassis 30 allows the guide rack 10 to be advanced through the front chassis 30.

As a result, the lower portion of the front panel 60 having been engaged with the slide link 17 is operated to be advanced.

In this case, the second right link 100 engaged with the upper portion of the front panel 60 and mounted on the inner surface of the right side of the front chassis 30 is moved from the upper portion of the vertical link guide slot 31' formed on the right end of the front panel 30 to its lower portion, thereby allowing the upper end of the front panel 60 to be lowered down. As shown in FIGS. 1 to 3, the first right link 90 connected to the front panel 60 is rotated around the link tab 32', and aids the front panel 60 to be smoothly laid down.

The second left link 80 engaged with the upper portion of the front panel 60 and mounted on the inner surface of the left side of the front chassis 30, as shown in FIG. 16, is moved from the upper portion of the vertical link guide slot 31 formed on the left end of the front panel 30 to its lower portion, thereby allowing the upper end of the front panel 60 to be lowered down. As shown in FIGS. 1 to 3, the first left link 70 connected to the front panel 60 is rotated around the link tab 32, and aids the front panel 60 to be smoothly laid down.

After the unlocking link 110 is pushed, the restoring force of the auxiliary spring 35' causes the unlocking link 110 to be rotated clockwise around the shaft 110a to its original position, thereby allowing the locking link 120 to be returned to its original position.

On the contrary, when a user pushes toward the main chassis 20 the front panel 60 having been laid down so as to erect the front panel 60 with his hand, the guide rack 10 is moved back into the main chassis 20.

Additionally, the first and second right links 90 and 100 and the first and second left links 70 and 80 having been operated to lay the front panel 60 down are operated in a reverse manner, thereby erecting the front panel 60.

As the guide rack 10 is moved into the main chassis 20, the main spring 12 is extended. When the slide hook 14 of the guide rack 10 reaches the locking notch 121 of the locking link 120, the slide hook 14 is engaged with the locking notch 121 of the guide rack 10. As a result, the guide rack 10 is locked, so the front panel 60 is kept fully erect.

As described above, the present invention provides an apparatus for operating the front panel of a car audio system, which is capable of manually operating the front panel (mounted on the front of the car audio system and provided with a control panel) to be selectively laid down and erected, thereby improving the degree of utilization of the front portion of the car audio system.

For example, the front panel is capable of being operated to be laid down, so a CD or cassette insertion slot is formed on the trim plate situated behind the front panel, thereby eliminating a necessity for forming a CD or cassette insertion slot on the control panel attached to the front panel. Accordingly, the size of a liquid crystal display that is arranged on the control panel can be enlarged and control buttons having various functions can be arranged on the control panel.

In the apparatus for operating the front panel of a car audio system, a spring mechanism is employed to operate the front panel instead of the an electrical drive mechanism such as an electric motor, so the structure of the apparatus can be simplified, thereby reducing the cost of the apparatus and reducing the possibility of breakdown of the apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for operating the front panel of a car audio system, comprising:
   a guide rack comprised of a rack body and a slide link, said rack body being provided with a guide slot horizontally extended, a spring holder for holding one end of a main spring, a guide gear portion formed on its upper surface and a slide link, said slide link being integrally extended from the front end of said guide rack;
   a main chassis provided at its right side with a plurality of rack shafts and a damper gear, said rack shafts being situated to be extended through the guide slot of said rack body so as to support said guide rack while said guide rack is slid, said damper gear being engaged with the guide gear portion of the rack body while said guide rack is reciprocated;
   a front chassis covering the open front of said main chassis, said front chassis being provided on both side ends of its front surface with two vertical link guide slots and two link tabs, on the upper and lower portions of its right end with a link guide recess and a spring holder, and on the interior portions of its both sides with auxiliary spring holders to hold first ends of two auxiliary springs;
   a trim plate covering the front surface of said front chassis, said trim plate being provided at its both sides with two vertical link guide slots;
   a front panel to which a control panel is attached, said front panel being provided on its right and left ends with a plurality of link holders and on its right end with a link guide recess, said front panel being connected to said front chassis and said guide rack so as to be laid down by the restoring force of a main spring held by the spring holders of said front chassis and said guide rack when said guide rack is slid; and a linkage for connecting the front chassis and the front panel, and selectively locking and unlocking the guide rack.

2. The apparatus according to claim 1, wherein said linkage comprises:

a first left link connected at its first end to a link tab formed on the left end of the front chassis, and at its second end to a link holder formed on the left end of the front panel through the vertical link guide slot formed on the left side of the trim plate;

a second left link, a first end of said second left link being connected to a link holder formed on the left end of the front panel through a vertical link guide slot formed on the left side of the trim plate, a second end of said second left link being provided with an auxiliary spring holder and inserted into a vertical link guide slot formed on the left side of the front chassis;

a first right link connected at its first end to a link tab formed on the left end of the front chassis, and at its second end to a link holder formed on the right end of the front panel through the vertical link guide slot formed on the right side of the trim plate;

a second right link, a first end of said second right link being connected to a link holder formed on the right end of the front panel through the vertical link guide slot formed on the right side of the front chassis, a second end of said second right link being provided with an auxiliary spring holder and inserted into the vertical link guide slot formed on the right side of the front chassis;

an unlocking link, a front portion of said unlocking link being situated to be extended through the link guide recesses formed on the right end of the front chassis and the right end of the front panel, a rear portion of said unlocking link being provided with an auxiliary spring holder and a link unlocking notch; and a locking link rotatably attached to the inner side of the right side of the main chassis in the vicinity of the guide rack, and provided with a projection for engaging with the link unlocking notch and a locking notch for engaging with the slide hook of the guide rack.

3. The apparatus according to claim 1 or 2, wherein said linkage is constructed to be operated in such a way that a user pushes the unlocking link extended through the link guide recess formed on the right end of the front panel, the unlocking link is rotated counterclockwise around its shaft, the locking link is rotated clockwise around its shaft by the projection engaged with the link unlocking notch, the slide hook of the guide rack is unlocked, and the elastic restoring force of the main spring allows the guide rack to be advanced through the front chassis, thereby operating the front panel to be laid down.

4. The apparatus according to claim 3, wherein said linkage is constructed to be operated in such a way that as the guide rack is moved into the main chassis, the main spring is extended, the locking notch of the locking link is engaged with the slide hook, and the guide rack is locked, thereby keeping the front panel fully erect.

* * * * *